United States Patent [19]

Ames et al.

[11] Patent Number: 4,896,958
[45] Date of Patent: Jan. 30, 1990

[54] FLEXIBLE CONTACT LENS FOR ENHANCED MOVEMENT ON THE EYE

[76] Inventors: Keith S. Ames, 102 Mayfair Dr., Rochester, N.Y. 14617; Steven G. Zantos, 53 Selborne Chase, Fairport, N.Y. 14450; Henry A. Knoll, 19 Oak St., Apt. #4, Bath, Me. 04530

[21] Appl. No.: 157,014

[22] Filed: Feb. 18, 1988

[51] Int. Cl.$^4$ .............................................. G02C 7/04
[52] U.S. Cl. .................................................. 351/160 R
[58] Field of Search ............... 351/160 R, 160 H, 161, 351/162

[56] References Cited

U.S. PATENT DOCUMENTS

| 722,059 | 3/1903 | Volle | 351/160 R |
| 3,187,338 | 6/1965 | Neefe | 351/160 R |
| 4,297,008 | 10/1981 | Woodford | 351/160 R |

FOREIGN PATENT DOCUMENTS

| 1170600 | 9/1958 | France | 351/160 R |
| 60-113208 | 6/1985 | Japan | 351/160 R |

Primary Examiner—Scott J. Sugarman
Attorney, Agent, or Firm—John S. Norton

[57] ABSTRACT

A flexible contact lens (20) is disclosed as having a central power portion (24), a peripheral flange portion (27), and an externally concave transition portion (26) joining the central portion and the flange portion, whereby the flange portion extends outwardly from the central portion in the manner of a hat brim. The inner edge of the peripheral flange is thereby raised from the eye surface to facilitate movement of the lens over the limbal region of the eye. The extent of the peripheral flange forward from the eye surface promotes eyelid contact to enhance movement of the lens on the eye. In a second embodiment (40), the lens further includes an externally convex transition portion (45) joining the central power portion (44) and the externally concave transition portion (46) to facilitate lens handling.

The invention also includes a method of producing such a flexible contact lens including the step of (a) forming a plastic mold on a tool which is a positive pattern of one surface of the desired lens, the resulting mold being a negative pattern of that surface, (b) placing unpolymerized fluid material in the mold, (c) rotating the mold to spread the fluid material at a desired thickness over the inner surface of the mold, (d) polymerizing the fluid material by appropriate means such as heat or ultra violet radiation, and (e) machining the opposite surface of the polymerized material to the desired lens configuration.

5 Claims, 1 Drawing Sheet

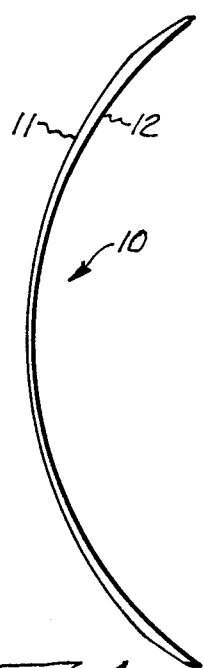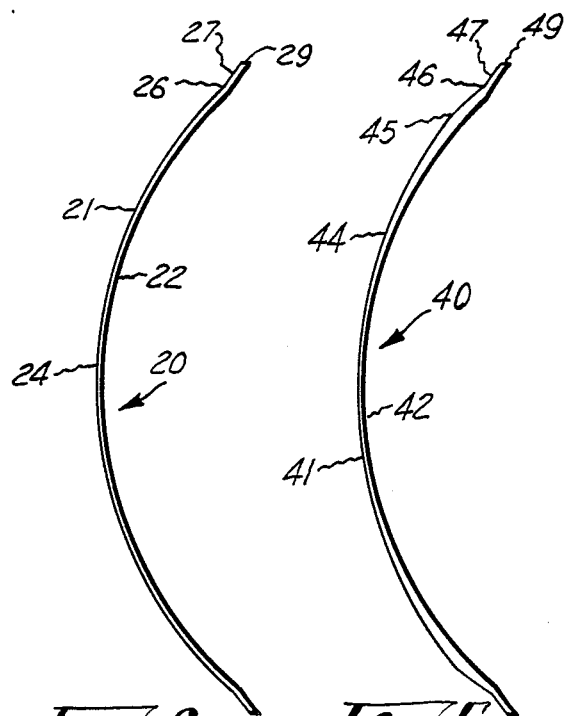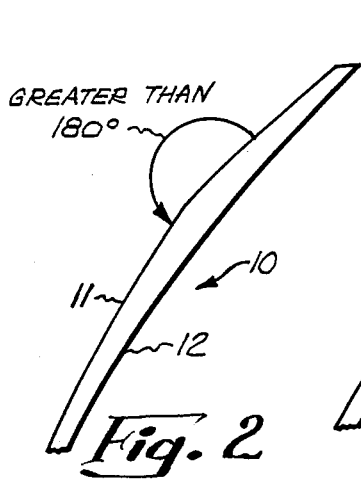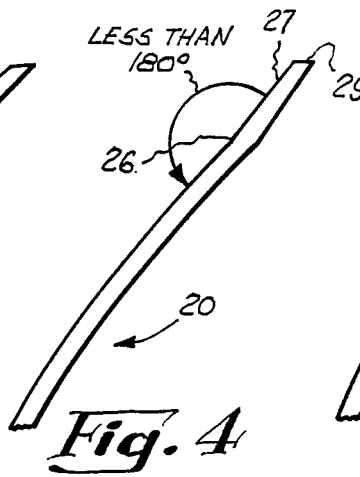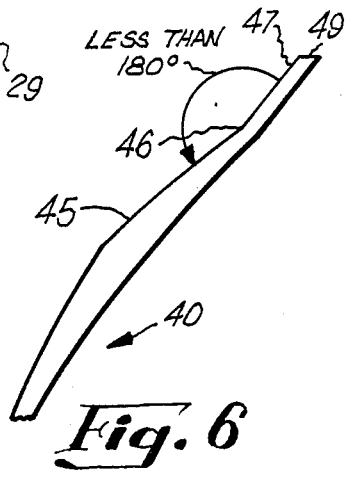

FLEXIBLE CONTACT LENS FOR ENHANCED MOVEMENT ON THE EYE

BACKGROUND OF THE INVENTION

1. Field of the Invention

This invention relates to flexible contact lenses, and particularly to a lens configuration to enhance movement of the lens on the eye.

2. Background Information

When it is in place, a contact lens rests on a film of tears on the corneal surface. To promote tear circulation, and the discharge of metabolic substances and debris from beneath a contact lens, it is desirable that the lens be movable on the eye, as for example in connection with blinking. Conventional soft lenses typically move on the eye, with the blinking of the eye, through a range of about 0.1 mm to about 0.4 mm. For the patient who removes contact lenses daily, such limited movement of the lens is sufficient to permit the required fluid exchanges. For extended wear, however, it is considered desirable that there be greater lens movement during blinking to increase fluid exchange.

Adequate lens movement is perhaps the most commonly used indicator of a successful soft lens fit. Heretofore, lens movement has been controlled by varying certain parameters such as curvature of the rear surface and lens diameter. Modern soft contact lenses, however, such as the thin, low water content hydrogels used in extended wear, respond less to changes in these conventional parameters.

SUMMARY OF THE INVENTION

This invention may be summarized as a flexible contact lens having a central power portion, a peripheral flange Portion, and an externally concave transition portion joining the central portion and the flange portion, whereby the flange portion extends outwardly from the central portion in the manner of a hat brim. The inner edge of the peripheral flange is thereby raised from the eye surface to facilitate movement of the lens over the limbal region of the eye. The extent of the peripheral flange forward from the eye surface promotes eyelid contact to enhance movement of the lens on the eye. In a second embodiment, the lens further includes an externally convex transition portion joining the central power portion and the externally concave transition portion to facilitate lens handling.

The invention also includes a method of producing such a flexible contact lens including the steps of (a) forming a concave surface on a tool which concave surface includes a central portion, a peripheral flange portion and a transition portion joining the central and peripheral portions, the peripheral flange portion extending outwardly from the central portion in the manner of a hat brim, (b) forming a plastic mold from the concave surface of the tool, the resulting mold being a negative pattern of that surface, (c) placing unpolymerized fluid material in the mold, (d) rotating the mold to spread the fluid material at a desired thickness over the inner surface of the mold, (e) polymerizing the fluid material by appropriate means such as heat or ultraviolet radiation, and (f) machining the opposite surface of the polymerized material to the desired lens configuration.

BRIEF DESCRIPTION OF THE DRAWINGS

FIG. 1 is a vertical cross section of a typical prior art flexible contact lens.

FIG. 2 is an enlarged detail from FIG. 1.

FIG. 3 is a vertical cross section of one form of flexible lens according to the invention.

FIG. 4 is an enlarged detail from FIG. 3.

FIG. 5 is a vertical cross section of another form of flexible lens according to the invention.

FIG. 6 is an enlarged detail from FIG. 5.

DESCRIPTION OF PREFERRED EMBODIMENTS

Referring now to FIGS. 1 and 2, a conventional soft hydrophilic contact lens 10 is illustrative of the prior art. The conventional lens 10 includes a front surface 11 which is entirely convex, and a rear surface 12 which is entirely concave. Lens 10 is placed on the patient's eye and clings thereto as a combined result of surface tension of the tear liquid and a suction cup effect of the lens. Lenses of this type typically move on the cornea, with the blinking of the eye, through a range of about 0.1 mm to about 0.4 mm.

From clinical experience it has been seen that conventional lenses, as just described, often displayed inconsistent amounts of movement at different times on the same patient. It was hypothesized, and controlled studies have confirmed, that the disparity of results is caused by patients occasionally and inadvertently placing a lens everted, or inside out, on the eye. In these studies, the everted lenses showed greater movement, regardless of lens material or manufacturing process. The everted lenses were also noted as less comfortable because in the everted condition there is a certain amount of edge lift or "curled up" edge on the lens which irritates the eye.

From these clinical observations and studies, lenses were devised which showed movement on the eye similar to the everted lens discussed above and which also provided significantly greater comfort. FIGS. 3 and 4 show one such lens of this invention. FIGS. 5 and 6 show a modified form of lens according to the invention.

In FIGS. 3 and 4, a soft lens 20 includes a front surface 21 and a rear surface 22, together forming a convex-concave central power portion 24, and annular concave-convex transition portion 26, and a peripheral flange portion 27. Front and rear surfaces 21 and 22 extend to a thin cylindrical peripheral edge 29. The lens central power portion 24 provides the desired lens power, and also a desired sagittal depth to the lens. The front and rear surfaces of the peripheral flange 27 extend outwardly from the central portion as shown to provide a desired edge lift.

In FIGS. 5 and 6, a soft lens 40 includes a front surface 41 and a rear surface 42, together forming a convex-concave central power portion 44, an annular convex-concave transition portion 45, an annular concave-convex transition portion 46, and a peripheral flange portion 47. Front and rear surfaces 42 and 42 extend to a thin cylindrical peripheral edge 49. The lens central power portion 44 provides the desired lens power, and also a desired sagittal depth to the lens. The front and rear surfaces of the peripheral flange 47 extend outwardly from the central portion as shown to provide a desired edge lift. In this configuration of FIGS. 5 and 6, the transition portions 45 and 46 not only join the central lens surface with the peripheral edge flange; they also increase the mid-peripheral thickness of the lens as an aid to lens handling.

The primary clinical significance of the edge configuration of this invention is the increased lens movement it provides. This is believed to be a combined result of two effects. First, the edge lift created by the curved inner surface of the peripheral flange 27, 47 provides less resistance to the lens crossing the limbal region of the eye. The lens more easily "rides up" over this boundary where the cornea, having a smaller radius of curvature, joins the sclera. Second, the forward extent of the curved outer surface of the peripheral flange promotes interaction between eyelid and lens, with resulting enhancement of lens movement and without substantially effecting the comfort of the lens on the eye.

A preferred method of making lenses according to this invention is as follows: A steel tool is formed as a positive pattern of the front surface of a lens, the tool including a convex central portion, a transition portion or portions, and a peripheral portion, corresponding to a lens front surface as in FIG. 3 or FIG. 5. A plastic mold is formed on this tool or pattern, the mold being a negative of the front surface of the lens. Unpolymerized material is poured into the mold, and the mold and fluid material are spun so that, by centrifugal force, the fluid material spreads over the inner surface of the mold at a uniform predetermined thickness. While the mold is spinning, he fluid material is polymerized by the application of ultra violet light, or heat, or other appropriate means to initiate polymerization. While still in the mold, the polymerized plastic lens material is lathed to form its rear surface in the desired lens configuration (the lens front surface is formed by the mold). After machining the lens to its final shape, the lens and mold are separated by application of water which softens and expands the lens so that it falls from the mold.

The foregoing process may also be carried out, modified by starting with a tool which is a positive pattern of the rear surface of a lens, with the mold formed on it being accordingly a negative of the rear of the lens. The required machining is therefore on the front of the lens instead of the rear. This is essentially the same process described in the preceding paragraph, except that various steps are directed to opposite sides of the lens.

The concept of this invention is applicable to any flexible lens material, including silicone elastomer and other non-hydrogel flexible lenses. Additionally, the contact lens of this invention may be made, for instance, by the process of spin-casting, cast molding or lathing among others.

While certain novel features of this invention have been shown and described and are set forth in the appended claims, it will be understood that various omissions, substitutions and changes in the forms and details of the contact lens illustrated and the method of making same can be made by those skilled in the art without departing from the spirit of the invention.

It is claimed:

1. A flexible contact lens, including a convex-concave central portion, a peripheral flange portion, and a concave-convex transition portion joining said central portion and said peripheral flange portion whereby said flange portion is outwardly extending relative to said central portion;
   the inner edge of said peripheral flange being thereby raised from the eye surface to facilitate movement of said lens over the limbal region of the eye; and
   the extent of said peripheral flange forward from the eye surface being effective for eyelid contact to enhance movement of said lens on the eye.

2. A flexible contact lens, including a front surface and a rear surface;
   said front surface including a convex central portion, a peripheral portion, and a concave transition portion joining said central and peripheral portions of said front surface;
   said rear surface including a concave central portion, a peripheral portion, and a convex transition portion joining said central and peripheral portions of said rear surface;
   said front and rear peripheral portions together forming a peripheral edge flange,
   the inner edge of said peripheral flange being thereby raised from the eye surface to facilitate movement of said lens over the limbal region of the eye; and
   the extent of said peripheral flange forward from the eye surface being effective for eyelid contact to enhance movement of said lens on the eye.

3. A flexible contact lens, including a front surface and a rear surface;
   said front surface including, in series from the vertex thereof, a convex central portion, a concave transition portion, and a peripheral portion;
   said rear surface including, in series from the vertex thereof, a concave central portion, a convex transition portion, and a peripheral portion;
   said front and rear peripheral portions together forming a peripheral edge flange;
   the inner edge of said peripheral flange being thereby raised from the eye surface to facilitate movement of said lens over the limbal region of the eye; and
   the extent of said peripheral flange forward from the eye surface being effective for eyelid contact to enhance movement of said lens on the eye.

4. A flexible contact lens, including a front surface and a rear surface;
   said front surface including in series from the vertex thereof, a convex central portion, a convex transition portion, a concave transition portion, and a peripheral portion;
   said rear surface including, in series from the vertex thereof, a concave central portion, a convex transition portion, and a peripheral portion;
   said front and rear peripheral portions together forming a peripheral edge flange,
   the inner edge of said peripheral flange being thereby raised from the eye surface to facilitate movement of said lens over the limbal region of the eye; and
   the extent of said peripheral flange forward from the eye surface being effective for eyelid contact to enhance movement of said lens on the eye.

5. A flexible contact lens as defined in claim 4 including said convex transition portion as means to facilitate handling of said lens.

* * * * *